April 17, 1956 H. BOOKMAN 2,742,303
FENDER SHIELD SECURING MEANS
Filed April 30, 1953
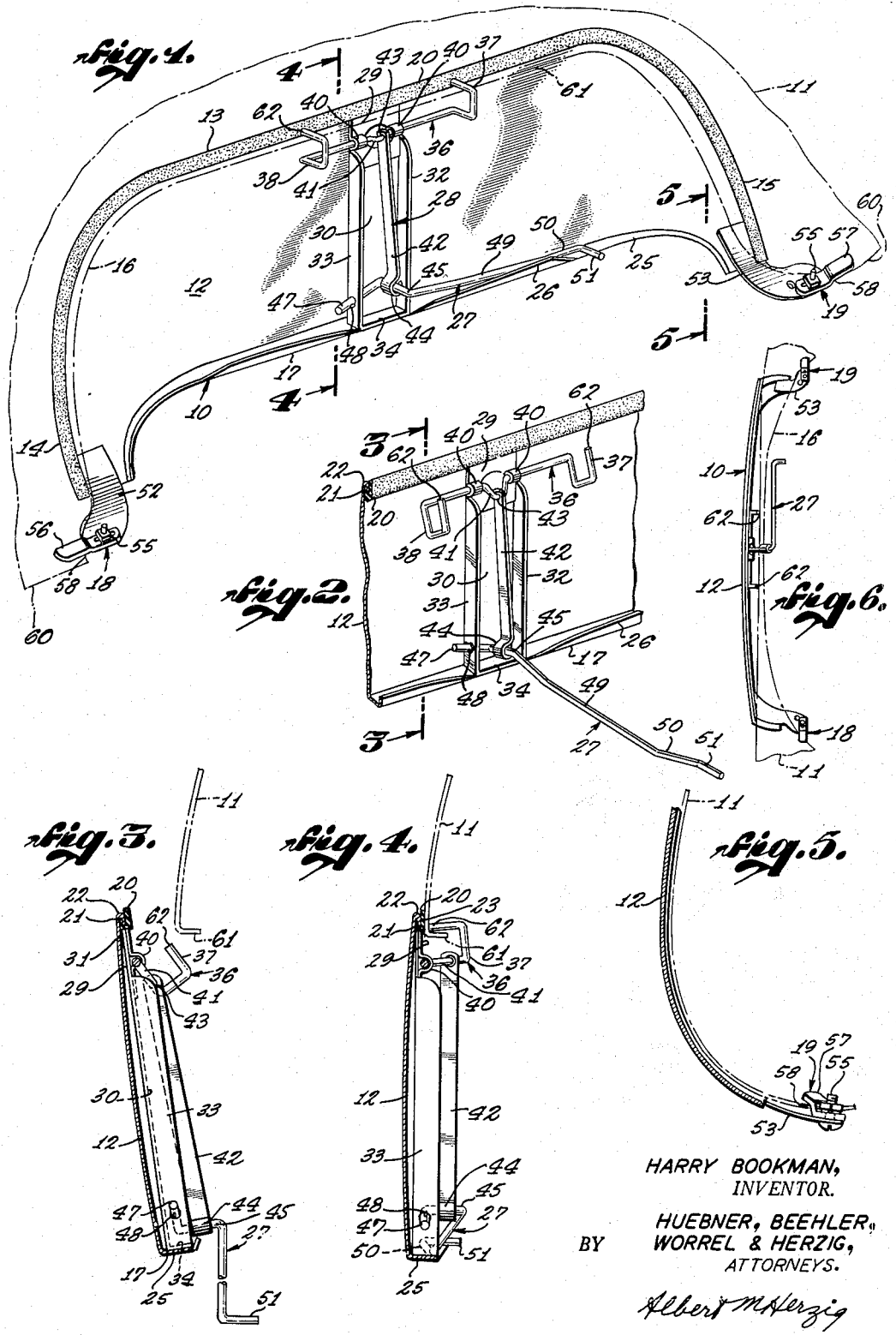
HARRY BOOKMAN,
INVENTOR.
HUEBNER, BEEHLER,
WORREL & HERZIG,
BY ATTORNEYS.

United States Patent Office 2,742,303
Patented Apr. 17, 1956

2,742,303

FENDER SHIELD SECURING MEANS

Harry Bookman, Los Angeles, Calif., assignor to Williams & Bennett Co., Compton, Calif., a corporation of California Application April 30, 1953, Serial No. 352,187

2 Claims. (Cl. 280—153)

This invention relates to fender shields adapted to cover the fender openings at the side of an automobile wheel, thereby shielding and streamlining the otherwise open side of a fender well. In particular it relates to a new and improved means for securing such a fender shield to the fender.

It is among the objects of the invention to provide, in a new and improved fender shield construction, new and improved means for securing a fender shield to a fender.

It is another object of the invention to provide such a new and improved securing means of simple and economical construction characterized by a facile mode of use and operation.

Another further object of the invention is the provision, in a new and improved fender-shield-securing means, with a primary securing means of adjustable character relative to opposed front and rear bottom edges of the fender shield, of a simple operating secondary clamp means adapted to be controlled from the underside of the shield effective to grasp the upper marginal edge of the fender and draw the shield inwardly thereagainst in clamped relationship while also most desirably affording insurance against relative downward sliding movement of the shield on the fender.

It is moreover among the objects of this invention to provide improvements over prior are devices heretofore intended to accomplish generally similar purposes.

With these and other objects in view, the invention consists of the construction, arrangement and combination of the various parts of the device whereby the objects contemplated are attained, as hereinafter set forth, pointed out in the appended claims and illustrated in the accompanying drawings.

In the drawings:

Figure 1 is an inside perspective view of a fender shield embodying this invention as used.

Figure 2 is a fragmentary perspective view thereof showing another operative position of the clamping means.

Figure 3 is a vertical sectional view taken as on a line 3—3 of Figure 2.

Figure 4 is a vertical sectional view taken as on a line 4—4 of Figure 1.

Figure 5 is a vertical sectional view taken as on a line 5—5 of Figure 1.

Figure 6 is a top view of Figure 1.

Referring more particularly to the drawings, a fender shield, shown by way of illustration but not of limitation, is generally designated by the numeral 10, and is related to the surrounding structure of an automobile fender 11.

The skirt 10 comprises a sheet metal shield body portion 12 suitably shaped along its upper marginal edge 13, its forward marginal edge 14 and its rearward marginal edge 15, to conform to the desired contour and shape of the fender 11, the fender opening 16, and an ultimate desired shape as externally viewed on the automobile.

The shape of the instant skirt body 12, including the bottom edge 17 thereof, and the forward and rearward clamps 18 and 19, respectively, as illustrated, is particularly suitable for use, for example, on 1949 and 1951 automobiles. However, the general construction herein disclosed is not intended for so limited a field of use, and is adaptable within the skill of one familiar with this art for use in a corresponding manner on other automobiles. The designations "forward" and "rearward" are for the purpose of this description and may therefore be deemed arbitrary as applied to the fender skirt.

The upper marginal edge 13 and the forward and rearward edges 14 and 15 of the shield are provided with a suitable cushioning strip as in the form of a rubber molding 20, which may have an edge, as 21, normally clampably retained under a doubled-over lip 22 of the shield body 12. Said molding 20 may also advantageously be cemented, as at 23, to the inner side of the doubled-over lip, in order that the molding will comprise a yieldable anti-rattling, non-abrasive area of contact around the fender opening 16 when the shield 10 is pressed against the outer surface of the fender 11 around said opening 16 in a manner to be described.

The fender shield body 12 is turned in, as at 25, defining a flange to reinforce the bottom edge of the fender shield against lateral bending movement and to provide longitudinal rigidity along said bottom edge 17. The flange 25 is also preferably turned up, as at 26, to provide a suitable detent and retainer for the operating handle 27 of the clamping mechanism generally designated at 28.

In addition, the fender shield preferably carries a vertical stiffener such as a bracket plate 29, and a downward extension or continuation thereof 30, the latter being preferably welded to said bracket plate, as in an overlapping portion thereof 31. The downward extension 30 preferably terminates at the bottom edge 17 of the shield and has inwardly turned edges 32, 33 and 34.

The bracket 27 and downwardly extending portion 30 thereof are designed to give the shield a desired degree of central reinforcement, and are accordingly solely secured, as by welding, at the top and bottom edges of the fender skirt to permit the body thereof to bow outwardly in any desired style and appearance, as seen most clearly in Figures 3 and 4.

The securing means 28 comprises a clamping arm 36, which, as seen in cross-sectional view, Figures 3 and 4 for example, defines a terminal U-shaped clamping portion 37 and 38. Said arm 36 makes horizontal hinged connection with the bracket 29—30 by means of pintle-forming ears 40 inwardly struck from the bracket 29. A crank-forming offset 41 in the center of the arm 36 is hingedly secured to a link 42 as by an opening 43 at an upper end of the latter.

The lower end 44 of the link 42 is curled about an inwardly directed offset 45 in the handle 27 to provide a pivotal securement thereto.

Said handle 27 is further pivotally secured as to one of the inturned edges 32, 33 of the central reinforcement 29, 30, as by means of an opening 46, through which an end 47 of the handle is adapted for loose tiltable accommodation and in which said handle end is retained as by means of dimples 48 outwardly struck therefrom.

It is desirable that the handle 27 have a relatively long lever arm 49 preferably including slight offset end portions 50, retained behind flange 26, and a terminal inwardly extending finger-piece 51. The length of the lever arm 49 will afford a desired degree of mechanical advantage to an operator in locking and clamping the clamp means 28 to a fender. It is preferable also that said lever 49 be formed of rod-like material having some degree of resilience so that the clamping when accomplished will be under a preferred spring-like tension.

At the lower forward and rearward ends of the shield, respective brackets 52 and 53 carry suitable openings 54, which may be slot-formed or round to permit the clamped securement, as by means of a nut and bolt 55 or the like securement, of tabs 56 and 57. The latter have any desired offsets 58, such offsets being adapted to engage the edges 16 of the fender opening when directed forwardly and rearwardly respectively so as to overlie a flange 60 normally provided along the bottom edge of the fender. In such position the offset 58 prevents relative forward and rearward movement of the shield along the fender wall.

In the use of the instant shield, the tabs 56 and 57 are turned forwardly and rearwardly, respectively, and clamped in a position most appropriate for the particular fender adaptation—in the instant example, so as to lie with their forward and rearward edges upon the inwardly turned flange 60 of the fender immediately forwardly and rearwardly of the fender opening. When the tabs are so adjusted, or if desired, subsequently to their being positioned on the flange 60, or otherwise at the bottom of the fender, the shield will be loosely held along its bottom edge so that it may be swung upwardly, clockwise, as shown in Figures 3, 4 and 5, around said tabs 56 and 57 as a pivot. It is preferable that the shield have a radius of curvature somewhat larger than that of the adjacent fender wall, as may be ascertained from Figure 5, in order that when the upper edge of the shield is so pivoted and manually pressed against the fender, a resilient securement will be occasioned by the forced bowing of the shield body 12 along its front and rear edges 14 and 15, as required to conform them to the lesser radius of curvature of the fender 11.

When the upper edge 13 of the skirt has been brought into contiguity with the corresponding upper part of the fender around the fender opening, the U-shaped clamp members 37 and 38 are preferably held in open position, as shown for example in Figures 2, 3 and 6. This is accomplished by unhooking the handle 27 from the flange 25 and permitting it to depend and carry said U-shaped portions around their pintles at 40 so that they will appear as in Figures 2 and 3, and will then clear the customarily provided inturned flange 61 defining the edge 16 of the fender opening (cf. Figure 3).

Now by moving the arm 27 upwardly, as in Figure 3, its pivotal movement around its end 47 will force the link 42 upwardly and, by virtue of the crank portion 41 on the arm 36, will turn said arm 36 in a counterclockwise direction, as shown in Figures 3 or 4, causing the ends 62 of the clamp members 37 and 38, by virtue of the shape of said members, to engage against the inner side of the fender wall, preferably immediately above said inturned flange 61, as shown in Figure 4, for example.

It is preferred that such engagement of the clamping ends or fingers 62 occur as the handle 27 is moved upwardly in a counterclockwise direction as shown in Figures 1 and 2, but before the bent portion 50 and finger-piece 51 have reached the level of the flange 25, in order that the last portion of the upward movement of said arm will cause some resilient flexing of the arm 27.

The pivotal connections at 44 and 48 are sufficiently loose that upon reaching the level of the flange 25—the arm then being in a slightly bent or flexed position, biasing the clamping fingers 62 against the inner wall of the fender—the lever arm 27 can also be raised over the detent forming flange portion 26 and swung outwardly so as to lie on the flange 25 and thereby releasably but firmly secure the shield upon the fender.

In order to remove the shield, it is merely necessary to raise the finger-piece 51 and move the lever arm 27 inwardly over the detent 26 and downwardly, thereby returning the clamping portions 37 and 38 from their clamped position as shown in Figure 4, to their unclamped position as shown in Figure 3.

In its unclamped position the skirt 10 is normally bowed outwardly from the fender, but when the clamping action is applied thereto, said slack or bowed position is taken up by the clamp to provide a resilient securement, not merely vertically along the shield relative to Figure 6, but as stated, relative to a vertical plane.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

Having thus described my invention, what I claim as new and desire to secure by Letters Patent is:

1. In a fender shield adapted to be secured to the fender of an automobile over a side well opening and over and against the outer fender surface around said well, said shield comprising a body portion having a radius of curvature normally greater than that of the fender surface normally overlain thereby, molding means around an upper edge portion of the shield adapted to bear against the outer wall of the fender, and means for securing the shield releasably on the fender comprising bottom edge securement means and top edge securement means being adapted to engage a bottom edge portion of the fender wall and retain a bottom portion of the shield thereagainst, said top securement means comprising finger means at an inside top portion of the shield mounted thereon for lateral outward movement towards the inner wall of the shield, manipulatable means for moving the finger means laterally outwardly, means releasably retaining said yieldable manipulatable means in a position of outward movement so as to clampably retain an upper edge of said fender between said finger means and said shield, securement means further comprising a clamp means, said finger means comprising an offset portion of said clamp means, bracket means pivotally securing said clamp means on said shield, and linkage means including crank means between the clamp means and the manipulatable means, said crank means moving said clamp means into clamping position under the influence of the manipulative means.

2. For an automobile fender having a side well opening, a fender shield of the character described having a bottom edge portion including means to secure the same to a lower edge of the fender adjacent the well, and a top edge portion including means for securing said top edge portion to the top edge of the fender above the well, said edges of said fender normally having inwardly directed flange means, the improvement wherein said top securing means is a clamp means comprising: a bracket means secured to the inner side of the fender shield, a clamp arm means pivotally secured on the bracket means on a horizontal axis and including a crank means and a generally U-shaped end means accommodating the flange means on the fender and engageable with the inner wall of the fender above said flange means, linkage means pivotally connected to crank means and lever means pivotally secured to the shield and the linkage means and having a manipulatable portion adapted, in the unclamped position of the clamp means, to depend below the lower edge of the fender shield, said lever means upon raising of the manipulatable portion to the lower edge of the fender shield operating through said linkage means to clamp said U-shaped end means against said inner wall of the fender to draw the shield radially thereagainst, and means at the bottom edge of the shield for releasably retaining said manipulatable portion.

References Cited in the file of this patent

UNITED STATES PATENTS

| | | |
|---|---|---|
| 2,070,230 | Harroun | Feb. 9, 1937 |
| 2,146,187 | Hynes | Feb. 7, 1939 |
| 2,193,134 | Hynes | Mar. 12, 1940 |
| 2,302,415 | Buchanan | Nov. 17, 1942 |
| 2,603,512 | Schatzman | July 15, 1952 |
| 2,611,629 | Ludwig | Sept. 23, 1952 |